J. N. COLLINS

COLLAR

Aug. 25, 1931. Re. 18,161

Original Filed April 2, 1929

INVENTOR
John N. Collins
BY
Mitchell & Beckert
ATTORNEYS.

Reissued Aug. 25, 1931

Re. 18,161

UNITED STATES PATENT OFFICE

JOHN N. COLLINS, OF YORK, PENNSYLVANIA, ASSIGNOR TO THE SHIRTCRAFT CO. INC., OF NEW YORK, N. Y., A CORPORATION OF NEW YORK

COLLAR

Original No. 1,782,000, dated November 18, 1930, Serial No. 351,900 filed April 2, 1929. Application for reissue filed May 12, 1931. Serial No. 536,888.

My invention relates to a collar, and particularly to a collar with stiffening means at the front edges.

It is the principal object of the invention to provide a collar having improved stiffening means along the front edges, arranged and embodied so as to be readily and cheaply manufactured, neat in appearance and serviceable in use.

Other minor objects and features of the invention will appear as the specification proceeds.

In the drawings, which show for illustrating purposes, preferred forms of the invention—

Figure 1:
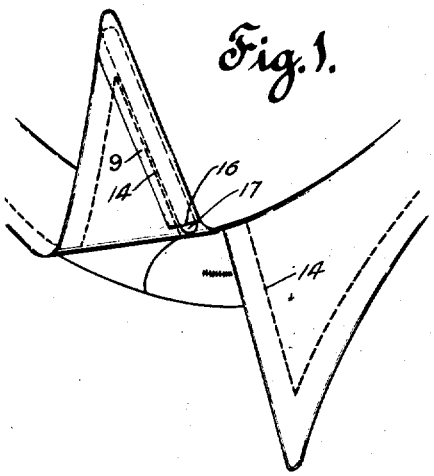
Fig. 1 is a front view of a collar, one corner being turned up to illustrate features at the rear of such corner.
Figure 4:
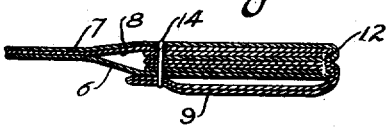
Fig. 4 is a sectional view taken substantially in the plane of line 4—4 of Fig. 3.

The construction and features of invention may perhaps best be described in connection with a description of the preferred method of manufacture.

In the drawings, 6 indicates an inner ply, while 7 indicates an outer ply of a collar. These plies as is usual in collar manufacture are arranged with the wrong side of the goods outwardly. If desired, a ply of interlining 8 may be interposed between the plies 6—7. Another ply which for convenience I term a pocket ply 9 is interposed between the plies 6—7. In the form shown the pocket ply is formed of one thickness of goods folded upon itself (with the right side of the goods outwardly) and with the edges lying substantially along the edges of the front of the plies 6—7. The top edges of the pocket ply may be folded inwardly as indicated by the dotted line 11 so as to leave a finished edge 10 at the top.

Figure 2:
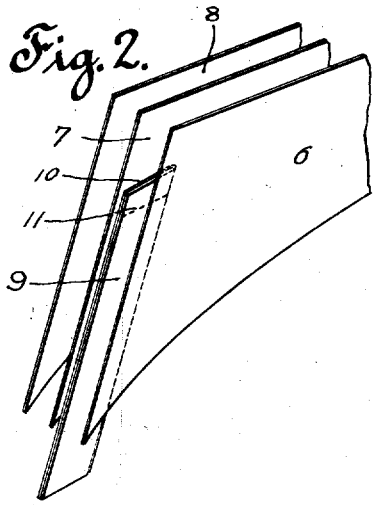
Fig. 2 is a somewhat diagrammatic view of parts of a collar before being stitched.
Figure 3:
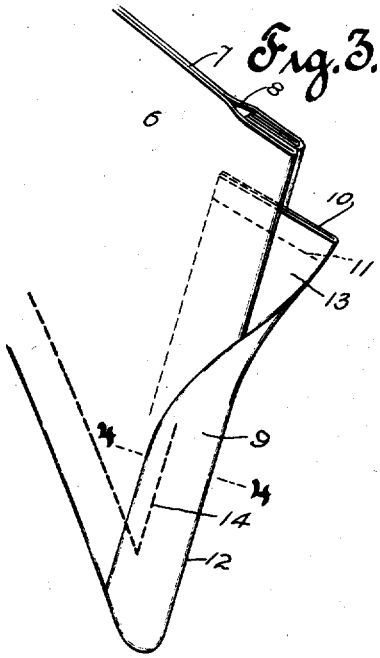
Fig. 3 is a view of the parts shown in Fig. 2 and partially stitched together.

All of the piles shown in Fig. 2 may then be stitched together by a common seam along the front edge as indicated more particularly at 12. The plies are also stitched along the bottom edge. The stitched together collar construction is then folded back so that the seam 12 will come at the extreme front edge of the collar and the fold of the ply 9 will extend outwardly as partially indicated at 13 in Fig. 3. The ply 9 is then folded back along the rear side of the rear ply 6 and is then stitched to the remaining plies as indicated at 14 so as to leave a pocket 15 extending well up toward the top of the collar as indicated more particularly at 16 in Fig. 1. The open pocket 15 may then receive a stiffening member such as celluloid strip 17 so that the front corners of the collar will be held straight and will not curl up. The pocket ply is preferably made of the same goods as that of the collar especially when colored or figured fabrics are employed. By means of my improved construction no additional seams are required and the labor and material costs in the manufacture of my collar are only trivially increased over the cost of corresponding collars without my improved pocket construction.

Figure 5:
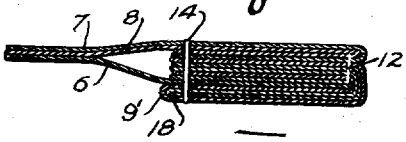
Fig. 5 is a view similar to Fig. 4 but illustrating a slight modification.

In that form of the invention shown in Fig. 5 substantially the same construction is employed and the method of manufacture is substantially the same as that heretofore described, except that instead of employing a separate stiffener 17 which may be removed I employ one or more plies such as stiff interlining material as indicated at 18 and preferably enclosed within a double thickness ply 9′, which by analogy may be termed a pocket ply. The construction shown in Fig. 5 with a proper grade of stiff material will be substantially non-curling and a collar so made will be found to be satisfactory in use.

While the invention has been described in considerable detail and a preferred form illustrated I do not wish to be strictly limited to the various details specifically disclosed, since obviously some changes may be made within the scope of the invention as defined in the appended claims.

I claim:

1. A collar including an outer ply, an inner ply, and an interlining ply together with a pocket ply interposed between said inner and outer plies and adjacent said interlining ply, all of said plies being stitched together by a common seam at the extreme edge of the collar, said pocket ply extending around the extreme outer edge of said inner ply and extending rearwardly thereof, and all of said plies being stitched together by a common seam and lying at the rear edge of said pocket ply.

2. A collar including outer and inner plies, a pocket ply, one edge of said pocket ply being interposed and held between the inner and outer plies, a seam at the extreme edge of said collar securing said plies together, the exposed part of the pocket ply being turned back along the rear of the inner ply, and a row of stitches penetrating all of said plies to hold the pocket ply in position at the rear of said inner ply.

3. A collar including outer and inner plies, a pocket ply, one edge of said pocket ply being interposed between the inner and outer plies adjacent their edges, the exposed part of the pocket ply being turned back along the underside of the inner ply, and a row of stitches penetrating all of said plies in folded position to hold the pocket ply closely adjacent the underside of said inner ply.

4. A collar including outer and inner plies and a pocket ply, one edge of said pocket ply being interposed between said inner and outer plies adjacent their edges, all of said plies being stitched together by a common seam at the extreme edge of the collar, the exposed part of said pocket ply being turned back along the underside of said inner ply, said pocket ply and said inner ply being stitched together by a seam substantially parallel to said first mentioned seam so as to hold said pocket ply closely adjacent the underside of said inner ply.

5. In combination with a collar including an outer ply, an inner ply and an interlining ply together with a pocket ply interposed between said inner and outer plies and adjacent said interlining ply, all of said plies being stitched together by a common seam at the extreme edge of the collar, said pocket ply extending around the extreme outer edge of said inner ply and extending rearwardly thereof, and all of said plies being stitched together by a common seam substantially parallel to said first mentioned seam at the rear edge of said pocket ply, said pocket ply forming an elongated pocket, of an elongated stiffening member disposed within said pocket.

6. A collar including inner and outer plies, an elongated pocket ply, one edge of said pocket ply being interposed and held between the inner and outer plies, a seam at the extreme edge of said collar and along the bottom edge of the collar, the exposed part of the pocket ply being turned back along the rear of the inner ply, and a row of stitches penetrating all of said plies to hold the pocket ply in said position at the rear of said inner ply, said pocket ply forming an elongated pocket closed at the bottom thereof and adapted to receive an elongated stiffening member.

7. A collar having outer and inner plies, an elongated pocket ply, one edge of said pocket ply being interposed between inner and outer plies adjacent their edges, said pocket ply terminating short of the upper portion of said collar, the exposed part of the pocket ply being turned back along the under-side of the inner ply, and a row of stitches penetrating all of said plies in folded position to hold the pocket ply closely adjacent the underside of said inner ply, said pocket ply forming an elongated pocket having an opening at the upper end thereof for receiving an elongated stiffening member.

8. A collar including outer and inner plies, an elongated pocket ply, a side edge of said pocket ply being interposed between the inner and outer plies adjacent their edges, the top edges of said pocket ply being folded inwardly to leave a finished edge at the top, the exposed part of the pocket ply being turned back along the underside of the inner ply, and a row of stitches penetrating all of said plies in folded position to hold the pocket ply closely adjacent the underside of said inner ply, said pocket ply forming an elongated pocket closed at the bottom end thereof and open at the top finished edge thereof and adapted to receive a removable elongated stiffening member.

9. In combination, a collar including outer and inner plies, and a pocket ply, said plies being stitched together by a seam at the extreme edge of said collar, said pocket ply having one edge lying between said inner and outer plies, and having another edge extending rearwardly at the outside of the inner ply and stitched thereto to leave a pocket between said pocket ply and said inner ply and a separate stiffening member removably received in said pocket.

10. A collar including an inner and outer ply with a pocket ply between said inner and outer plies, said plies being stitched together by a common seam at the extreme edge of the collar, said pocket ply extending rearwardly at the outside of said inner ply and being stitched thereto rearwardly of the collar edge on a seam substantially parallel to said first mentioned seam so as to leave a pocket between said pocket ply and said inner ply, said pocket ply terminating short of the upper edge of the collar to provide an opening for said pocket and a stiffening member inserted within said pocket thru said open end.

11. A collar including inner and outer plies and a pocket ply of stiff material interposed between said inner and outer plies, said plies being stitched together by a common seam at the extreme edge of said collar, said pocket ply extending rearwardly along the rear side of said inner ply and being stitched thereto along the rear edge of said pocket ply to form an elongated pocket extending substantially the length of said edge, and an elongated stiffening member received in said pocket.

12. A collar including outer and inner plies and a pocket ply, one edge of said pocket ply being interposed between said inner and outer plies adjacent their edges, all of said plies being stitched together by a common seam at the extreme edge of the collar, the exposed part of said pocket ply being turned back along the underside of said inner ply, to form a pocket along the edge of said collar, said pocket ply terminating short of the upper edge of the collar to permit insertion of a stiffening member into said pocket.

Signed at New York city this 4 day of May, 1931.

JOHN N. COLLINS.